Patented Nov. 23, 1948

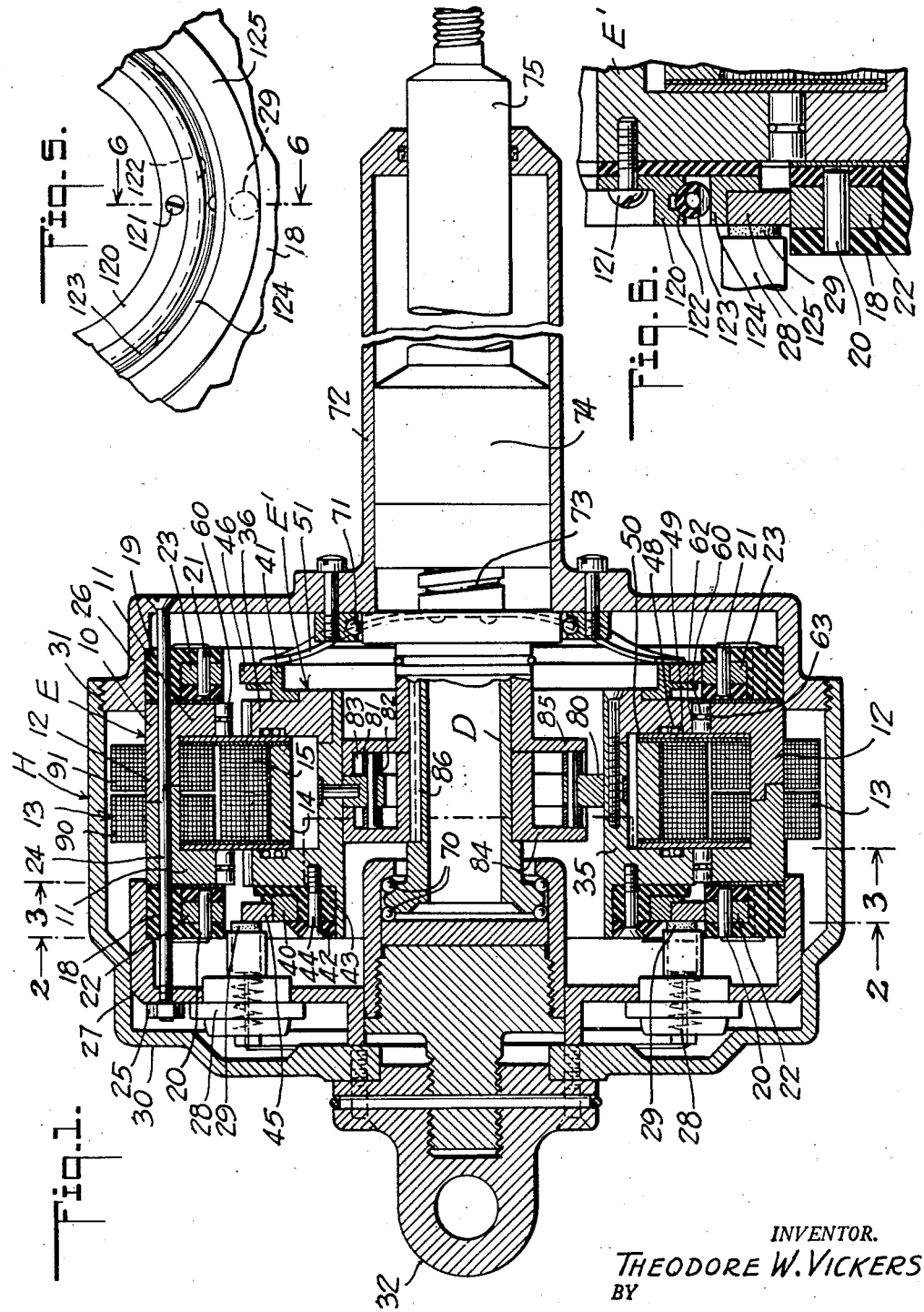

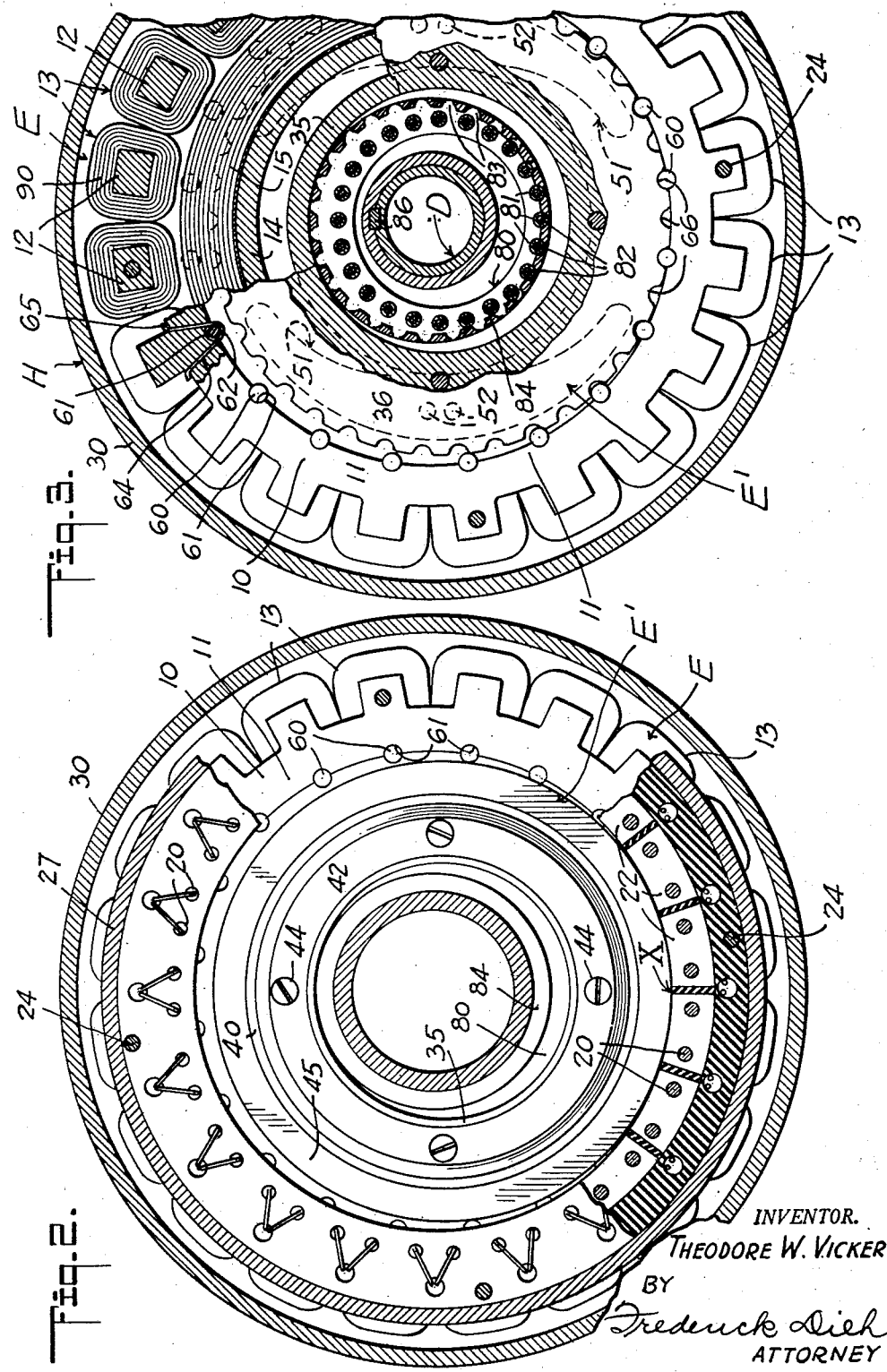

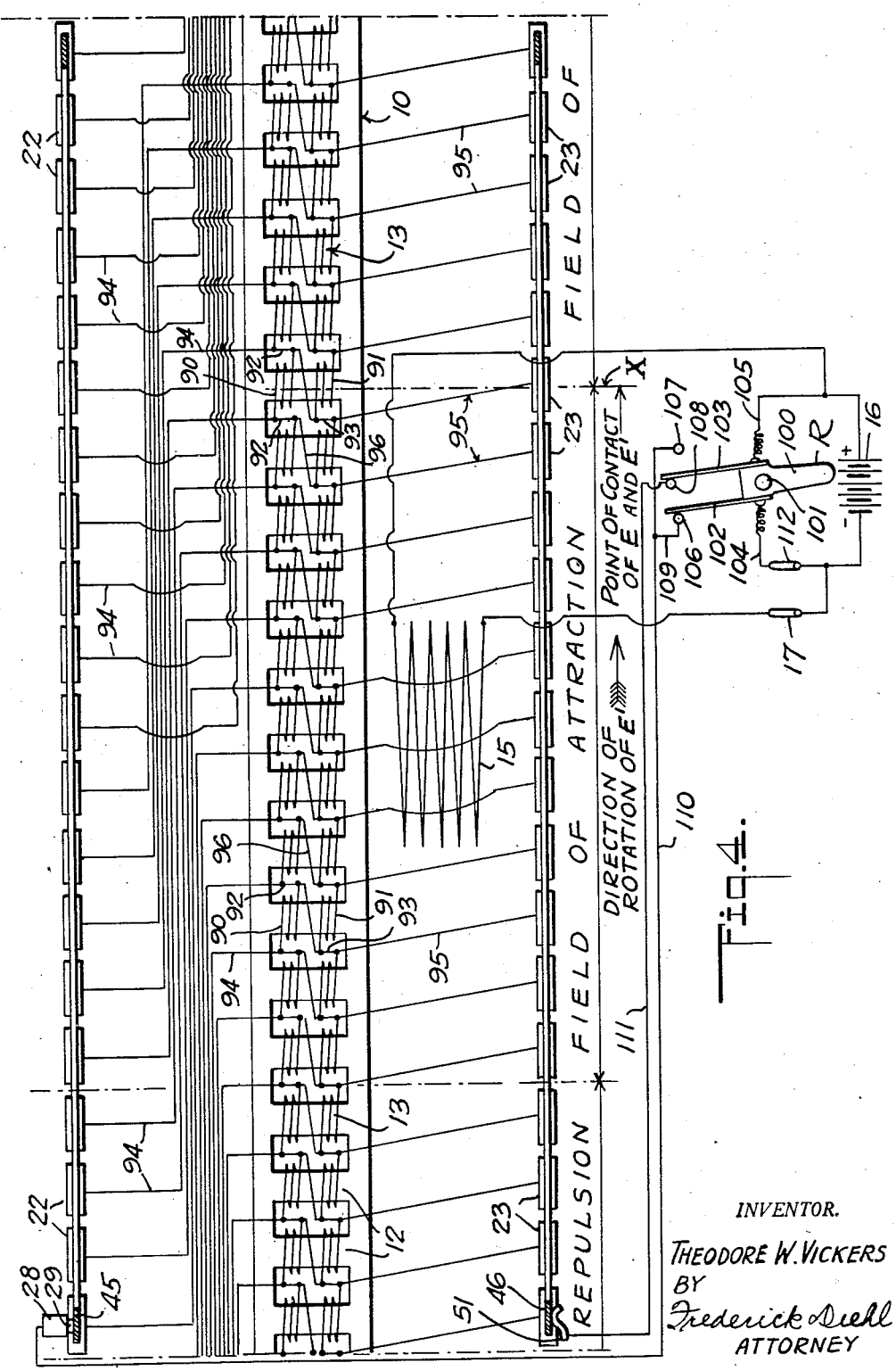

2,454,359

UNITED STATES PATENT OFFICE 2,454,359

ELECTRICAL MACHINE

Theodore W. Vickers, Los Angeles, Calif.

Application July 24, 1945, Serial No. 606,852

19 Claims. (Cl. 172—36)

This invention relates to electrical machines of the general character embodied in my United States Letters Patents Nos. 2,378,668, 2,378,669, issued June 19, 1945, and to my co-pending application Serial No. 498,937, filed May 24, 1943, now Patent 2,413,805, issued January 7, 1947. These patents and application disclose and claim an electrical machine which embodies relatively movable and specifically rotatable magnetic fields operatively associated to derive mechanical force from the compression of a magnetic field by moving the point of application of the force in a path effecting continuous force displacement rotationally, which can be utilized to perform useful work. In one specific embodiment, the inventions utilize one or more air gaps created between two electromagnetic elements of the machine, which are mounted in hypocyclic relationship to move relatively in a curvilinear path and are co-actable in response to a force acting continuously across the air gap, to convert the acting force into the relative movement of the elements, all while maintaining the gap and causing it to progress in a manner to continue the relative movement between the elements.

The broad principle of obtaining continuous mechanical force along a predetermined path from a rotating field causing progression of fields of attraction and repulsion in the air gap at opposite sides of a point of contact between the two electromagnetic elements, is inherent in the present invention which has many additional objects, functions and advantages among which are the following:

1. To further reduce the weight of the machine and render it extremely compact in comparison to its power output.

2. To reduce the length of the air gap and thereby obtain greater magnetic efficiency between the two electromagnetic elements, yet allow the rotatable element to be positively rotated about its own axis without slipping relative to the other element and with a minimum of frictional loss, all so as to transmit with increased efficiency, the force developed by the flux across the air gap.

3. To provide a novel form of positive non-slipping driving connection between the magnetic elements which precludes the possibility of the rotor element being shifted to such adverse position relative to the stator element, that the commutating mechanism of the machine, specifically composed of commutator rings rolling upon commutator bars or segments, would be rendered inoperative by disengagement of the rings from the bars with consequent stopping of the machine, as is a possibility in prior machines using a conventional internal gear driving connection between the magnetic elements.

4. To provide commutator rings freely mounted rotatably on journals on the rotor element, and rolling on the commutator segments, as (a) the mechanical bearings for the rotor element; (b) a means to insure a highly efficient electrical contact between the rings and segments; (c) a means for obtaining a rolling contact between the rings and segments to obviate premature or excessive wear on their working surfaces; (d) a means for maintaining parallelism between the axes of the stator elements by virtue of the relation and construction of the bearing surfaces therebetween; and (e) a means to reduce the need for a lubricating medium between the rings and segments, which medium has the disadvantage of collecting metal dust which creates unwanted current paths.

5. To remove all electrical windings from the rotor element so as to reduce its weight and hence its inertia to a minimum, as well as dispensing with one set of brushes and slip rings.

6. To convert the eccentric motion of the rotor element into the rotary motion of a driven member or shaft about a fixed axis, by the use of a novel roller gear driving connection therebetween.

7. To provide two or more tightly coupled windings on each electromagnet of a circular set thereof, which are so connected from one magnet to another that variations of flux in the cores of the windings as occurs during operation of the machine, will be transferred by transformer action to the windings of other magnets in positions more advantageous to the production of torque in the respective fields of attraction and repulsion, without increasing the amount of current consumed by the machine for a given output. This mode of transferring energy from one magnet to another to move the rotor, utilizes a portion of the energy stored in those coil windings at the point of reversal, rather than permit such stored energy to be dissipated in heat by arcing between the commutator rings and segments as the rings commutate the coil windings. The E. M. F. produced by this transformer action aids in overcoming the C. E. M. F. caused by the increase in flux in the coil cores as the air gap reluctance decreases in advance of the moving rotor element, all to the end of enabling the machine to consume current at higher speeds and thus increase the torque due to the increase in the magnetomotive force at such higher speeds. This transformer action also reduces arcing between commutator rings and segments by reducing the time rate of change of flux in the shorted coils.

8. To locate the rings and segments in the fringing flux around the air gap between the stator and rotor elements, so as to aid in extinguishing arcs which might form under certain operating conditions such as high altitudes, and from foreign matter between adjacent commutator segments, between segments and commutator rings, or between the segments and ground.

With these and other objects in view, the invention resides in the combinations, arrangements and functional relationships of elements as set forth in the following specification and particularly pointed out in the appended claims.

In the accompanying drawings,

Figure 1 is a view showing in longitudinal section, one form of electrical machine embodying this invention, and applied to an aircraft actuator;

Figures 2 and 3 are transverse sectional views taken, respectively, on the lines 2—2 and 3—3 of Figure 1;

Figure 4 is a schematic view in the form of a flat development of the two co-acting electromagnetic elements, and illustrating the electrical and magnetic circuits of the machine;

Figure 5 is a fragmentary view of a modified form of commutator ring mounting embodied in the invention; and Figure 6 is an enlarged sectional view taken on the line 6—6 of Figure 5.

Referring specifically to the drawings, the invention in its present embodiment is shown for the purpose of illustration, applied to an aircraft actuator, and is composed of relatively movable electromagnetic elements E and E' which are eccentrically related, with the inner element E' rotatable and operatively connected to a driven member D to transmit rotary motion thereto, it being understood that one or the other element and its associated mechanism may be rotatable within the scope of this disclosure.

The non-rotatable or stator element E constitutes the rotating field of the machine, and is in the form of a solid or laminated two-section annular body 10 of iron. The body 10 is U-shaped in cross section to provide spaced annular webs 11, and is slotted axially to provide uniformly spaced intervening bars which constitute the cores 12 of a circular series of electromagnets 13 of which there are twenty in the present design and size of machine.

Supported on a ring 14 and disposed between the webs 11 of the body 10 in concentric relation thereto is a field winding 15, which, as shown diagrammatically in Figure 4, is connected in series with a source of direct current supply 16 under the control of a switch 17, in order to enable the stationary field to be energized or de-energized at will.

At opposite sides of the body 10 are two-part insulating ring supports 18 and 19 of a commutating mechanism, between which are secured by pins 20 and 21, sets of commutator segments 22 and 23, there being one segment 22 and one segment 23 for each electromagnet 13, so that there are twenty segments in each set. The body 10 and the supports 18 and 19 are clamped together with the internal annular surfaces of the segments concentrically related to the body 10, by means of suitable tie bolts 24 and nuts 25 which secure the stator element E between one section 26 of a cylindrical housing H and a cup-shaped support 27 for a plurality of brush holders 28 whose spring-pressed brushes 29 are uniformly spaced circumferentially and may be two or more in number.

The other section 30 of the housing H is threaded onto the section 26 at 31 and is provided with a central attaching lug 32 in the particular illustrated use of this invention in an aircraft actuator.

The rotor element E' is also in the form of a two-part annular body 35 of U-shaped cross section to provide annular webs 36 confronting the webs 11 of the stator body 10. From Figures 1 and 3 particularly, the hypocyclic or eccentric relationship of the elements E and E' will be clearly apparent, and it will be noted that the amount of eccentricity is very small in order to obtain an air gap of minimum length for maximum magnetic efficiency. Fixed to the sections of the rotor body 35 are journal rings 40 and 41, with the ring 40 insulated from the rotor body by being clamped between two insulating rings 42 and 43 secured to the body 35 by screws 44, whereas the ring 41 is directly secured to the body 35, all as clearly shown in Figure 1. Rotatably mounted on the journal rings 40 and 41 are commutator rings 45 and 46 which form part of the aforestated communicating mechanism, and are of an outside diameter to roll freely upon the internal surfaces of the respective sets of commutator segments 22 and 23 so as to co-act therewith in providing the mechanical load-supporting bearings for the rotor element E' to maintain the axis of the latter in parallelism with the axis of the element E. This parallelism of elements is aided by opposed end thrust bearings 47 and 48 mounted in pockets 49 in the confronting faces of the webs 36 and in rolling contact with bearing rings 50 of the stator element E as clearly shown in Figure 1, it being understood that there are a number of these thrust bearings in uniformly spaced relationship circumferentially around the webs 36. The brushes 29 are urged into contact with the outer side face of the ring 45, whereas other flat spring brushes 51 fixed to the housing section 26 by screws 52, bear against the outer side face of the ring 46 to provide the necessary electrical connections to the rings, and to further aid in maintaining the aforestated axially parallel relationship of the elements E and E' so as to obviate premature and excessive wear upon the working surfaces of the rings 40, 41 and segments 22, 23, as well as prevent any binding action of the element E' in the element E.

The stator element E and the rotor element E' are operatively connected by a positive driving connection which comprises a set of rollers 60 rotatably mounted in half bearings in the form of semicircular recesses 61 uniformly spaced circumferentially in the internal annular surfaces of the webs 11. The rollers 60 are confined against displacement from these recesses by retainer stirrups 62 extending partly around annular grooves 63 in the rollers and through bores 64 (Figure 3) in the body 11, with the extremities of the stirrups bent laterally at 65 to secure them in place.

In the present instance the rollers 60 are adapted to enter semi-circular recesses 66 in the webs 36 of the rotor element E' during movement of the latter, so as to provide the aforesaid driving connection, it being noted that the rollers 60 are spaced apart exactly twice that of the recesses 66. As an illustration, there are twenty rollers and thirty-nine recesses, which, due to the double spacing of the rollers relative to that of the recesses, produces a ratio of one rotation of the rotor element E' to thirty-nine gyrations thereof.

The driving member D is journaled co-axially of the stator element E at one end in a suitable radial and thrust bearing 70, and in a radial bearing 71 supported by the section 26 of the housing H. From the bearing 71, the member D extends freely into a tubular extension 72 of the housing section 26, and is externally threaded at 73 for co-action with a nut member 74 slidably mounted in the extension 72, in providing a conventional ball bearing screw nut known as the "Saginaw" drive. The nut member 74 has a sleeve extension 75 projecting from the extension 72 to provide a second attaching means co-actable with the attaching lug 32 in relatively moving the two parts (not shown) attached thereto, towards or away from each other according as the driven member D is rotated in one direction or the other through a driving connection similar to that provided by the rollers 60 and recesses 66.

This driving connection is composed of an annular support 80 fixed to the rotor body 35, and carrying rollers 81 journaled in pairs on end portions of axles 82 at opposite sides of the support. These rollers 81 are adapted to enter arcuate recesses 83 in laterally flanged disks 84 and 85 fixed on opposite sides of the support 80 to the driven member D by a key 36, all as shown in Figures 1 and 3. The rollers 81 and the recesses 83 are spaced apart at equal center to center distances, and in the present instance there are twenty-four rollers and twenty-five recesses to provide a ratio of 25 to 1 at the driven member D.

Each electromagnet 13 includes two or more insulated windings wound on the core 12, there being two windings 90 and 91 disclosed for the purpose of illustrating the principle of this invention, and the windings being series-connected by conductors 92 and 93, respectively, as shown in Figure 4. The segments 22 are connected by conductors 94 to conductors 92 between adjacent windings 90 which are at approximately 180 degrees displaced from the respective segments 22, whereas the segments 23 are connected by conductors 95 to the conductors 93 between adjacent windings 91 which are at approximately 0 degrees displacement from the segments 23, all as shown in this figure. Furthermore, the windings are arranged in parallel in a novel manner by jumpers 96 for a purpose to be later described.

In controlling the electrical machine to rotate the driven member D in one direction or the other, a reversing switch R is provided. This switch comprises an insulated arm 100 pivoted at 101 about a fixed axis and carrying two flexible contact members 102 and 103 connected by conductors 104 and 105 respectively, to opposite sides of the source of current 16. The contact members 102 and 103 are adapted to co-act with contacts 106, 107 and 108, the contacts 106 and 107 being connected by conductors 109 and 110 to the brushes 29, and the contact 108 being connected by a conductor 111 to the brushes 51. A main switch 112 is provided to control the supply of current to the reversing switch R in the operation of the invention which is as follows:

Let it be assumed that current is being supplied to the machine by closing the switches 17 and 112, and by closing the commutation circuit through contacts 106 and 108 of the reversing switch R, as a result of which 180 degree fields of attraction and repulsion will be created in the air gap between the elements E and E' at opposite sides of the point of contact X as shown in Figure 4, by the flow of current in the magnetic circuits as follows:

From one side of the current source 16 through the field winding 15 to the other side of the current source so as to produce a non-changing or stationary magnetic field. From one side of the current source 16 through conductor 105, contact member 103, contact 108, conductor 111, brush 51, commutator ring 46, that one of the commutator segments 23 engaged by the commutator ring 46 at the point of contact X, then through the respective conductor 95 to conductor 93, a portion of the current now flowing through the windings 91 of those electromagnets 13 to the left of the point of contact X, and a portion of the current flowing through the windings 91 of those magnets to the right of said point of contact, with these two portions uniting in that conductor 93 which lies approximately 180 degrees distant from the point of contact X, then through a jumper 96 and a conductor 92 to that conductor 94 which will deliver the current to the commutator segment 22 with which the commutator ring is in engagement at the point of contact X, brush 29, conductor 110, conductor 109, switch contact 106, contact member 102, conductor 104, switch 112, to the other side of the current source 16.

The remaining portion of the current flowing through the aforestated conductors 95 and 93, flows through the connected jumper 96 to conductor 92, at which point the current divides, with a portion of the current flowing through the windings 90 of the magnets 13 to the left of the point of contact X, and the other portion of the current flowing through the windings 90 to the right of said point of contact, with these two current portions uniting in that conductor 92 which lies at approximately 180 degrees distant from the point of contact X, then through the aforestated conductor 94, commutator segment 22, ring 45, brush 29, conductor 110, conductor 109, switch contact 106, contact member 102, conductor 104, switch 112, to the other side of the current source.

As a result of the above described circuits, the electromagnets 13 within 180 degrees from one side of the point of contact X will have one polarity, whereas those electromagnets 13 within 180 degrees from the other side of the point of contact X will have opposite polarity, so that the magnets react upon the field induced in the rotor element E' by the field winding 15, to create forces of attraction and repulsion on opposite sides of the point of contact, whereby to impart motion to the rotor element perpendicular to its axis of rotation. The rotor element is thus caused to rotate and impart rotation to the driven member D so as to feed the nut member 74 in one direction.

By actuating the switch R so that its contact members 102 and 103 engage switch contacts 107 and 108, respectively, the flow of current through the electromagnets 13 is reversed, thus reversing the locations of the fields of attraction and repulsion to effect rotation of the rotor element E' in the reverse direction, hence reversing the direction of rotation of the driven member D and feeding the nut member 74 in the reverse direction. It will be clear from the foregoing, that as the commutator rings 45 and 46 successively engage the commutator segments 22 and 23, respectively, during rotation of the element E', the field created by the electromagnets 13 is caused to rotate in one direction or the other in accordance with the direction of current flow in the above described circuits.

It will be noted that as the commutator rings 45 and 46 reach a position in which they momentarily bridge two adjacent segments 22 and also two adjacent segments 23, the winding 91 of one magnet 13 on one side of the point of contact X, and the winding 90 of an adjacent magnet on the other side of the point of contact X, are shorted. One of these magnets lies on the attraction side of the point of contact X, whereas the other magnet lies on the repulsion side of the point of contact. Thus, by virtue of the jumper connections 96 between the windings, and the reaction of the related fluxes through the cores 12 of the shorted windings, there is a transfer of stored energy from the shorted windings to the windings of other magnets 13 in positions more advantageous to the production of torque in the respective fields of attraction and repulsion, without increasing the amount of electrical energy consumed by the machine for a given output.

It will be noted from Figure 4 that for any coil 90 or 91, its core 12 is part of a closed magnetic circuit through adjacent coil cores to the right and left. This condition applies to any coil in any position, so that there is present a set of identical coils and cores with the ends of the latter all magnetically connected in a continuous parallel series. This arrangement produces a set of closed core transformers with each core 12 having two identical windings 90 and 91, either one of which can be a primary and the other a secondary, so that by transformer action current variations in one will cause a corresponding current change in the other.

Furthermore, it will be appreciated that the applied current in coils 90 and 91 wound on any core 12 is always in the same direction so that their flux potentials are in series except for those coils undergoing commutation at the two points along the series of coils. These two points define the limits of the fields of attraction and repulsion. As the rotor moves, these points of commutation move, one point being shown in Figure 4 as contact X of E and E'. This causes the commutator rings 45 and 46 to move along the series of contacts 22 and 23 in unison with the point of contact X.

It will be clear from Figure 4 that with the switch R in the position shown, ring 46 contacting segment 23 at X, and ring 45 contacting segment 22 at X, projected, and by using the right hand rule, that the portion of the iron body facing downward and in the field of attraction will, at the left of X, have a North polarity, and that portion of the body 10 facing upward will have a South polarity, whereas to the right of X which is the field of repulsion the end of the magnets facing downward will have a South polarity and their ends facing upward a North polarity. Thus, with the rotor E' polarized by the coil 15 with a South polarity towards the bottom, and with a North polarity towards the top, the fields of attraction and repulsion as above set forth, will be clearly understood.

As the rotor E' is being drawn into the field of attraction and pushed out of the field of repulsion, it causes the point of contact X between the ring 46 and the segment 23, and between the ring 45 and the segment 22 to move, so as to move the field of attraction. As a result, alternating current is passing through those coils adjacent to the points of commutation, with some coils acting as primaries and some as secondaries. As the current flows along a conductor 95 from a segment 23, the current divides to the right and left. Thus, current will be flowing through the connected coil in one direction, and, as the ring 46 moves to the next segment 23 the current in such connected coil will recede to zero and then rise to a maximum in the opposite direction.

Due to the magnetic potential from adjacent coils and to the fact that only one-half the turns on one core 12 are shorted and reversed as the rings 45 and 46 move from one segment to the next segment, the net change of flux linkages will be spread over a period of time much greater than that during which the contact rings are respectively in contact with two adjacent segments. This change of flux linkages is also controlled by the stationary field 15, to the end that the core 12 which is being commutated will always be saturated. Thus, the reversal of the current produces but negligible change in flux linkages, the actual change in flux occurring after the point of contact of the rotor E' has moved a few degrees. Therefore, there will be no arcing from self-induced voltages at the time of reversal, with the result that the energy in the field which is not absorbed by heat losses in the conductors will either be used to produce torque, or be returned to the system.

By the provision of the roller driving connections between the stator and rotor elements E and E' and between the latter and the driven element D, the length of the air gap can be reduced to a minimum for increased magnetic efficiency, and the positive driving connections obtained with a minimum of frictional loss, by eliminating sliding friction as much as possible and substituting the relatively negligible rolling friction therefor. Furthermore, with the rotor element E' free of all windings, its weight is materially reduced, with the attending reduction of its inertia.

It will be noted that the power take-off provided by the rollers 81 and recesses 83 between the rotor element E' and the driving member D is located centrally with respect to the commutator bearing rings 45 and 46, and that the rings, driving rollers and thrust bearings 48 are all symmetrically related to this power take-off mechanism, thus stabilizing the rotor and effectively opposing any tendency for the rotor element to assume a tilted or non-parallel position axially with respect to the stator element. It will also be noted that the commutator rings 45, 46, and segments 22, 23, are located in the fringing flux around the air gap between the rotor and stator elements, to aid in extinguishing arcs occurring under certain conditions in the commutating mechanism.

Reference will now be had to Figures 5 and 6 which disclose a modified form of mounting for the commutator rings which comprises a supporting ring 120 rigidly secured to the rotor element E' by screws 121, and having an annular peripheral groove 122 in which is seated a yieldable ring 123 of resilient rubber or other suitable material on which is tightly fitted a journal ring 124. Rotatably mounted on the journal ring 124 is a commutator ring 125 similar to the commutator rings 45 and 46 and adapted for rolling engagement with the commutator segments 22 or 23. By the provision of the yieldable ring 123, and the slight oversize external diameter of the commutator ring 125, the yieldable ring will be placed under slight stress or compression at and adjacent to the point of contact X, so as to aid in maintaining the commutator ring 125 in engagement with the segments 22 or 23 at the point of contact when the supply of current to the machine is discontinued, to thus cause the machine to remain operative for restarting when current is again supplied to the machine.

In conclusion, it will be understood by those familiar with the art, that the non-changing or stationary field provided by the field winding 15 can be obtained by omitting this field winding and constructing the rotor element E' of a flux-retaining metal.

Therefore, the disclosure of this invention is to be broadly construed to include such structural variations as being electrical equivalents, and that the terms "field winding" and "electromagnetic elements" as used in the claims, are to be broadly construed as covering both the field winding 15 and a flux-retaining rotor element as the source of the non-changing field.

It will be noted that the particular shape of the rotor element E' facilitates the use of various well-known alloys such as "Nupermag," "The Alnicos," and other permanent magnetic materials which are ordinarily difficult to work.

It is appreciated that when using a permanent magnetic material for the rotor element E' the demagnetizing power of the field of repulsion must be taken into consideration. However, the greatest demagnetizing force is where the rotor element E' is closest to the field of repulsion, i. e., near the point of contact X. As the above-described coils 90, 91 of the magnets 13 and their connections, cause one or more coils that lie between the fields of attraction and repulsion to have a neutral magnetizing force, this arrangement will aid in protecting a permanent magnetic rotor element against demagnetization. Further, under these conditions, the first active magnet 13 next to such "neutral coil magnet" will provide a path for its flux through the core 12 of the adjacent neutral magnet core, so as to widen the area of protection for the permanent field in the rotor element.

It will also be understood that there are conditions under which it would be advantageous to use materials other than iron for the cores 12 of the magnets 13. Examples of such materials are "Ferronickels," "Ferrocobalts," "Constant permeability alloys," and "silicon steels" as well as utilizing slotted or laminated parts.

Should it be desired to have the electrical machine operate in one direction only, or to consume more power in one direction than the other, this can be readily accomplished by shifting the commutating mechanism to dispose the short connector, one coil into the field of attraction, which arrangement will give the flux more time to change direction at the point of contact X. This shifting of the commutating mechanism is analogous to advancing the spark in a gasoline engine.

I claim:

1. An electrical machine of the class described comprising: two electromagnetic elements; means mounting said elements in hypocyclic relationship for relative rotation to define an air gap between the elements increasing in length from a point therebetween; means for energizing one of said elements to create a non-changing magnetic field; one of said elements having a circular set of electromagnets operating in said magnetic field; means for supplying current to said magnets to create a rotating field in which a predetermined number of the magnets will be maintained at one polarity while the remaining magnets will be maintained at the opposite polarity, so that forces of attraction and repulsion will be created across predetermined portions of the air gap, to move the rotatable element; and means by which flux variations in the cores of the magnets occurring as the magnets are successively shorted during rotation of the rotatable element, are caused to be transferred by transformer action to other magnets in such positions as will produce more torque in the fields of attraction and repulsion without increasing the amount of current consumed by the machine for a given output.

2. An electrical machine of the class described comprising: two electromagnetic elements; means mounting said elements in hypocyclic relationship for relative rotation to define an air gap between the elements increasing in length from a point therebetween; means for energizing one of said elements to create a non-changing magnetic field; one of said elements having a circular set of electromagnets each having a plurality of windings and operating in said magnetic field; means for supplying current to said magnets to create a rotating field in which a predetermined number of the magnets will be maintained at one polarity while the remaining magnets will be maintained at the opposite polarity, so that forces of attraction and repulsion will be created across predetermined portions of the air gap, to move the rotatable element; and means providing such electrical connections between the windings of said magnets as will cause flux variations in the cores of the magnets occurring as the magnets are successively shorted during rotation of the rotatable element, to be transferred by transformer action to the windings of other magnets in positions to produce more torque in the fields of attraction and repulsion without increasing the amount of current consumed by the machine for a given output.

3. An electrical machine of the class described comprising: two electromagnetic elements; means mounting said elements in hypocyclic relationship for relative rotation to define an air gap between increasing from a point between the elements; means for energizing one of said elements to create a non-changing magnetic field; one of said elements having a circular set of electromagnets operating in said magnetic field; each of said magnets having a plurality of windings series-connected to the respective windings of the other magnets; means for supplying current to said magnets to create a rotating field in which a predetermined number of the magnets will be maintained at one polarity while the remaining magnets will be maintained at the opposite polarity, so that forces of attraction and repulsion will be created across predetermined portions of the air gap, to move the rotatable element; and jumpers so connecting the windings of the magnets in parallel, that flux variations occurring in the cores of the magnets as they are shorted during rotation of the rotatable element, will be transferred by transformer action to other magnets in positions to produce more torque in the fields of attraction and repulsion without increasing the amount of current consumed by the machine for a given output.

4. An electrical machine of the class described comprising: two electromagnetic elements; means mounting said elements in hypocyclic relationship for relative rotation to define an air gap between the elements increasing in width from a point therebetween; one of said elements having a winding adapted when energized, to create a non-changing magnetic field, one of said elements having a circular set of electromagnets operating in said magnetic field; commutator rings adapted for connection to a source of current supply and journaled in axially spaced relation on one of said elements concentrically thereof; circular sets of commutator segments concentrically related to the other element and on which said rings roll during motion of the rotatable element, to support the mechanical load of the latter; and means electrically connecting said segments to said magnets.

5. An electrical machine of the class described comprising; two electromagnetic elements; means mounting said elements in hypocyclic relationship for relative rotation to define an air gap between the elements; one of said elements having a winding adapted when energized, to create a non-changing magnetic field; one of said elements having a circular set of electromagnets operating in said magnetic field; commutator rings adapted for connection to a source of current supply and journaled in axially spaced relation on one of said elements concentrically thereof; circular sets of commutator segments concentrically related to the other element and on which said rings roll during motion of the rotatable element, to provide radial bearings for the latter; opposed end-thrust bearings between said elements co-acting with said rings in maintaining the elements in parallelism axially; and means electrically connecting said segments to said magnets.

6. An electrical machine of the class described comprising: two electromagnetic elements; means mounting said elements in hypocyclic relationship for relative rotation to define an air gap between the elements; one of said elements having a winding adapted when energized, to create a non-changing magnetic field; one of said elements having a circular set of electromagnets operating in said magnetic field; commutator rings adapted for connection to a source of current supply and mounted on one of said elements concentrically thereof; sets of commutator segments concentrically related to the other element and successively engaged by said rings during motion of the rotatable element; and means electrically connecting said magnets to said segments; said rings and segments being located in the fringing flux around the air gap between said elements so as to aid in extinguishing arcs forming under certain conditions in the commutating mechanism.

7. An electrical machine of the class described comprising: two electromagnetic elements; means mounting said elements in hypocyclic relationship for relative rotation to define an air gap between the elements; means for energizing one of said elements to create a non-changing magnetic field; one of said elements having a set of electromagnets operating in said field; means for supplying current to said magnets to create magnetic force across the air gap applying torque to the rotatable element; and a positive driving connection between said elements including rollers journaled at equally spaced intervals around at least one of the elements, with which surfaces on the other element have rollable driving engagement to preclude shifting of the rotatable element to such adverse positions relative to the other element as would disrupt the supply of current to said magnets by said current-supplying means.

8. An electrical machine of the class described comprising: two electromagnetic elements; means mounting said elements in hypocyclic relationship for relative rotation to define an air gap between the elements; one of said elements having a winding adapted, when energized, to create a non-changing magnetic field; one of said elements having a circular set of electromagnets operating in said magnetic field; commutator rings adapted for connection to a source of current supply and mounted on one of said elements concentrically thereof; sets of commutator segments concentrically related to the other element and successively engaged by said rings during motion of the rotatable element; means electrically connecting said magnets to said segments; and rollers journaled at equally spaced intervals around one of said elements adapted for rollable engagement in correspondingly shaped recesses in the other element to provide a driving connection between the elements, yet preclude shifting of the rotatable element to such adverse positions relative to the other element as would disengage said rings from said segments and stop the machine.

9. An electrical machine of the class described comprising: two electromagnetic elements; means mounting said elements in hypocyclic relationship for relative rotation to define an air gap between the elements; one of said elements having a winding adapted, when energized, to create a non-changing magnetic field; one of said elements having a circular set of electromagnets operating in said magnetic field; commutator rings adapted for connection to a source of current supply and journaled in axially spaced relation on one of said elements concentrically thereof; circular sets of commutator segments concentrically related to the other element and on which said rings roll during motion of the rotatable element, to provide radial bearings for the latter; opposed end-thrust bearings between said elements co-acting with said rings in maintaining the elements in parallelism axially; means electrically connecting said segments to said magnets; and current conducting brushes urged in opposed directions axially into engagement with the side faces of said rings at such circumferentially spaced intervals as will cause the brushes to aid in maintaining the aforesaid axial parallelism of the elements.

10. An electrical machine of the class described comprising: two electromagnetic elements; means mounting said elements in hypocyclic relationship for relative rotation to define an air gap between the elements; one of said elements having a winding adapted when energized, to create a non-changing magnetic field; one of said elements having a circular set of electromagnets operating in said magnetic field; commutator rings adapted for connection to a source of current supply and journaled in axially spaced relation on one of said elements concentrically thereof; circular sets of commutator segments concentrically related to the other element and on which said rings roll during motion of the rotatable element, to provide radial bearings for the latter; opposed end thrust bearings between said elements co-acting with said rings in maintaining the elements in parallelism axially; means electrically connecting said segments to said magnets; a driven member rotatably mounted about a fixed axis; and means for transmitting the motion of the rotor element to said driven member at a point along the axis of the rotor element substantially medially between said rings and end thrust bearings, to aid same in maintaining the aforesaid axial parallelism of said elements.

11. An electrical machine of the class described comprising: two electromagnetic elements; means mounting said elements in hypocyclic relationship for relative rotation to define an air gap between the elements; one of said elements having a winding adapted when energized, to create a non-changing magnetic field; one of said elements having a circular set of electromagnets operating in said magnetic field; commutator rings adapted for connection to a source of current supply and journaled in axially spaced relation on one of said elements concentrically thereof; circular sets of commutator segments concentrically related to the other element and on which said rings roll during motion of the rotatable element; means electrically connecting said segments to said magnets; a driven member rotatably mounted about an axis co-axially related to said other element; and a positive driving connection between said rotor element and driven member including a circular series of uniformly spaced rollers journaled on at least one of said elements and adapted to have a rollable driving engagement with correspondingly spaced surfaces on the other element to reduce frictional loss to a minimum with an air gap of minimum length for greater magnetic efficiency.

12. An electrical machine of the class described comprising: two electromagnetic elements; means mounting said elements in hypocyclic relationship for relative rotation to define an air gap between the elements; one of said elements adapted when energized, to create a non-changing magnetic field; one of said elements having a set of electromagnets operating in said magnetic field; means for supplying current to said magnets to create a rotating field operable to exert magnetic force across said air gap upon the rotatable element to drive same; a driven member rotatably mounted about an axis co-axially related to the other element; and a positive driving connection between the rotatable element and driven member including a circular series of uniformly spaced rollers journaled on at least one of said elements and adapted to have a rollable driving connection with correspondingly spaced portions of the other element to reduce frictional loss to a minimum while utilizing an air gap of minimum length for greater magnetic efficiency.

13. An electrical machine of the class described comprising: a stator element; a rotor element hypocyclically related to the stator element to define an air gap between the elements increasing in width from one point therebetween; said stator element having a winding adapted when energized, to create a non-changing magnetic field; said stator element having a circular set of series-connected electromagnets operating in said magnetic field, whereby to leave the rotor element free of the weight of said windings and electromagnets to reduce the inertia of the rotor element to a minimum; and means for supplying current to said magnets to create a rotating magnetic field by which magnetic force will be exerted across said air gap to move the rotor element.

14. An electrical machine of the class described comprising: a stator element; a rotor element hypocyclically related to the stator element to define an air gap between the elements increasing in width from one point therebetween; a field winding electrically associated with said elements, to create a non-changing magnetic field; one of said elements having a circular set of series-connected electromagnets operating in said magnetic field; commutator rings journaled on said rotor element and spaced axially of the latter in co-axial relation thereto; sets of commutator segments on which the respective commutator rings roll during movement of the rotor element, to support the radial load of the latter and to be successively engaged by the rings; and means electrically connecting said sets of segments to said magnets in a successive order and in a predetermined angular relationship to each other so that with said rings in circuit with a source of current supply, said magnets will be energized to create magnetic force across the air gap applying force to the rotor element.

15. An electrical machine of the class described comprising: a stator element; a rotor element hypocyclically related to the stator element to define an air gap between the elements increasing in width from one point therebetween; a field winding electrically associated with said elements, operable when energized, to create a non-changing magnetic field; one of said elements having a circular set of series-connected electromagnets operating in said magnetic field; commutator rings journaled on said rotor element and spaced axially of the latter in co-axial relation thereto; sets of commutator segments on which the respective commutator rings roll during movement of the rotor element, to support the radial load of the latter and to be successively engaged by the rings; means electrically connecting said sets of segments to said magnets in a successive order and in a predetermined angular relationship to each other so that with said rings in circuit with a source of current supply, said magnets will be energized to create magnetic force across the air gap applying force to the rotor element; and a positive driving connection between said elements including rollers journaled at equal intervals around one element, adapted to enter correspondingly spaced recesses in the other element to provide a rollable driving engagement preventing slipping of the rotor element relative to the stator element and maintaining the aforestated rolling engagement of the commutator rings on the commutator segments.

16. An electrical machine of the class described comprising: a stator element; a rotor element hypocyclically related to the stator element to define an air gap between the elements; a field winding electrically associated with said elements, operable when energized, to create a non-changing magnetic field; one of said elements having a circular set of series-connected electromagnets operating in said magnetic field; commutator rings journaled on said rotor element and spaced axially of the latter in co-axial relation thereto; sets of commutator segments on which the respective commutator rings roll during movement of the rotor element, to support the radial load of the latter and to be successively engaged by the rings, means electrically connecting said sets of segments to said magnets in a successive order and in a predetermined angular relationship to each other so that with said rings in circuit with a source of current supply, said magnets will be energized to create magnetic force across the air gap upon the rotor element; a positive driving connection between said elements including rollers journaled at equal intervals around the one element, adapted to enter correspondingly spaced recesses in the other element to provide a rollable driving engagement preventing slipping of the rotor element relative to the stator element and maintaining the aforestated rolling engagement of the commutator rings on the commutator segments; a driven shaft rotatably mounted about a fixed axis; and a positive driving connection between the rotor element and driven shaft including a circular series of uniformly spaced rollers journaled on at least one of said elements and adapted to have rollable driving engagement with correspondingly spaced portions of the other element.

17. An electrical machine of the class described comprising: two electromagnetic elements; means mounting said elements in hypocyclic relationship for relative rotation to define an air gap between the elements increasing in width from a point between the elements; one of said elements having a winding, adapted when energized, to create a non-changing magnetic field; one of said elements having a circular set of electromagnets operating in said magnetic field; commutator rings; means rotatably mounting said rings in axially spaced relation on the rotor element, to resiliently yield in radial directions; sets of commutator segments on which said rings roll during rotation of the rotor element; and means electrically connecting said segments to said magnets; said ring mounting means being placed under sufficient radial stress to aid in maintaining the rings in engagement with said segments when the supply of current to the machine is discontinued, so that the machine will remain operative for restarting when current is again supplied to the machine.

18. An electrical machine of the class described comprising: two electromagnetic elements; means mounting said elements in hypocyclic relationship for relative rotation to define an air gap, between the elements increasing in width from a point therebetween; one of said elements having a winding, adapted when energized, to create a non-changing magnetic field; one of said elements having a circular set of electromagnets operating in said magnetic field; commutator rings; bearing rings having journals on which said commutator rings are mounted for rotation; resilient rings carried by the rotor element and on which the bearing rings are supported to resiliently mount the commutator rings on the rotor element; commutator segments on which said commutator rings roll during rotation of the rotor element; and means electrically connecting said segments to said magnets.

19. An electrical machine of the class described comprising: two electromagnetic elements; means mounting said elements in cyclic relationship for relative rotation to define an air gap between the elements increasing in length from a point therebetween; means for energizing one of said elements to create a non-changing magnetic field; one of said elements being composed of an annular iron body having openings at intervals to define circumferentially spaced cores whose ends are connected by the material of the body, with said cores each having a plurality of windings for co-action in providing a circular set of electromagnets operating in said magnetc field; means for supplying current to said magnets to create a rotating field in which a predetermined number of the magnets will be maintained at one polarity while the remaining magnets will be maintained at the opposite polarity, so that forces of attraction and repulsion will be created across predetermined portions of the air gap, to move the rotatable element; and means by which flux variations in the cores of the magnets occurring as the magnets are successively shorted during rotation of the rotatable element, are caused to be transferred by transformer action to other magnets in such positions as will produce more torque in the fields of attraction and repulsion without increasng the amount of current consumed by the machine for a given output; the relation of the parts of said set of electromagnets and the rotatable element and its field, causing certain flux changes produced by commutation, to shift out of time phase with the commutation.

THEODORE W. VICKERS.

REFERENCES CITED

The following references are of record in the file of this patent:

UNITED STATES PATENTS

| Number | Name | Date |
|---|---|---|
| 586,823 | Patten | July 20, 1897 |
| 1,495,784 | Fereday | May 27, 1924 |
| 2,318,503 | Leischner | May 4, 1943 |
| 2,345,835 | Serduke | May 4, 1944 |